US005667056A

United States Patent [19]
Kimmet

[11] Patent Number: 5,667,056
[45] Date of Patent: Sep. 16, 1997

[54] HANGER TRANSPORT SYSTEM

[75] Inventor: Gary S. Kimmet, Galloway, Ohio

[73] Assignee: Sears, Roebuck and Co., Hoffman Estates, Ill.

[21] Appl. No.: 480,044

[22] Filed: Jun. 6, 1995

[51] Int. Cl.[6] .................................................. B65G 47/34
[52] U.S. Cl. ........................... 198/463.5; 198/465.4
[58] Field of Search ........................... 198/465.4, 463.5, 198/459.5

[56] References Cited

U.S. PATENT DOCUMENTS

| | | | |
|---|---|---|---|
| 1,025,853 | 5/1912 | Bartholomew . | |
| 3,799,318 | 3/1974 | Dekoekkoek | 198/463.5 |
| 3,799,395 | 3/1974 | Vanderpool . | |
| 3,961,699 | 6/1976 | Hirsch | 198/463.5 X |
| 4,927,054 | 5/1990 | Heinold | 198/463.5 X |
| 5,046,844 | 9/1991 | Milton . | |
| 5,358,090 | 10/1994 | Hirao et al. | 198/463.5 X |
| 5,573,101 | 11/1996 | Ouwejan | 198/465.4 X |

OTHER PUBLICATIONS

Videotape received from W&H Systems, Inc. (No Date).

*Primary Examiner*—D. Glenn Dayoan
*Attorney, Agent, or Firm*—Marshall, O'Toole, Gerstein, Murray & Borun

[57] ABSTRACT

A system for transporting a plurality of hangers on which a plurality of garments may be hung, having a hook transport system with at least a hook conveyor and a plurality of hooks disposed along the hook conveyor, the hooks being moved by the hook conveyor along a conveyance direction at a first rate, a hanger supply member on which the plurality of hangers may be disposed, and a hanger feed apparatus adapted to periodically feed one of the hangers from the hanger supply member to a hanger pickup position. The hanger feed apparatus is adapted to cause a plurality of physical contacts to be made between the hook transport system and the hanger feed apparatus, the physical contacts occurring at a second rate substantially equal to the first rate. Each of the physical contacts causes one of the hangers to be fed from the hanger supply member to the hanger pickup position, and the hooks of the hook transport system periodically pick up the hangers from the hanger pickup position. The hanger feed apparatus has a hanger holding member coupled to the hanger supply member, a pivotable feed member coupled to the hanger holding member, and an actuator mechanically coupled to the feed member and disposed to periodically make contact with the hooks, the actuator causing the feed member to transfer one of the hangers from the hanger supply member to the hanger pickup position when one of the hooks makes contact with the actuator.

19 Claims, 3 Drawing Sheets

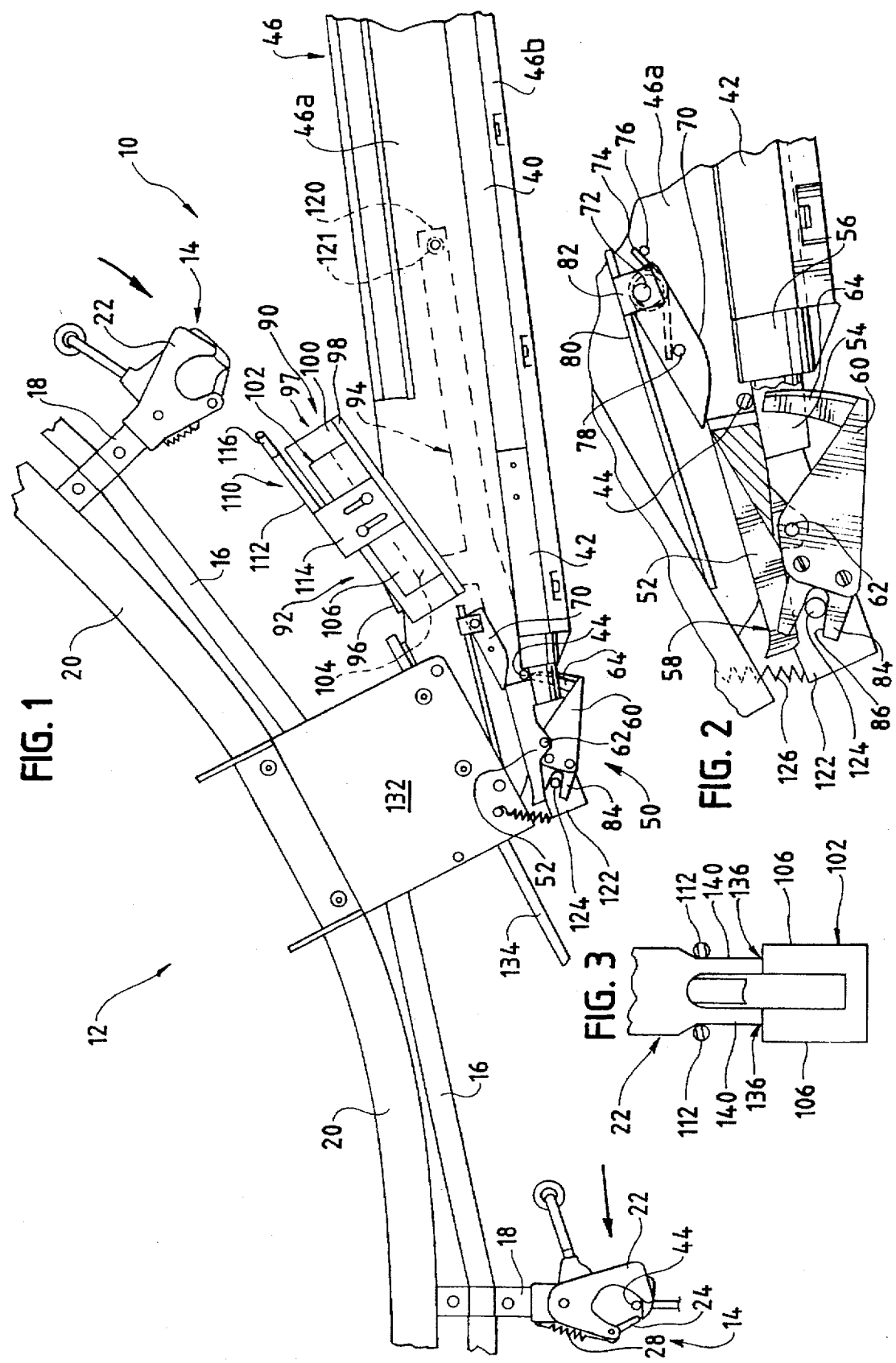

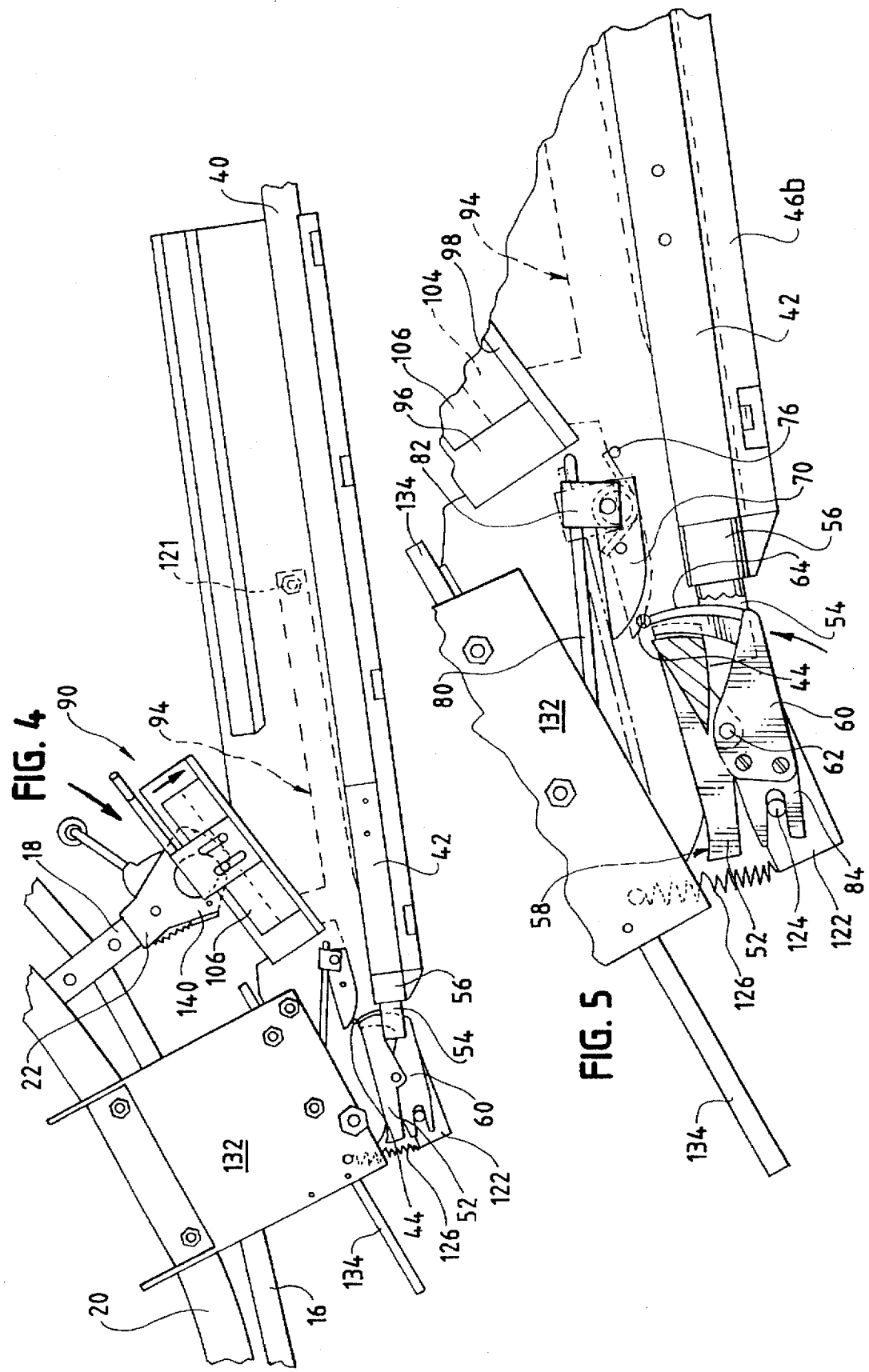

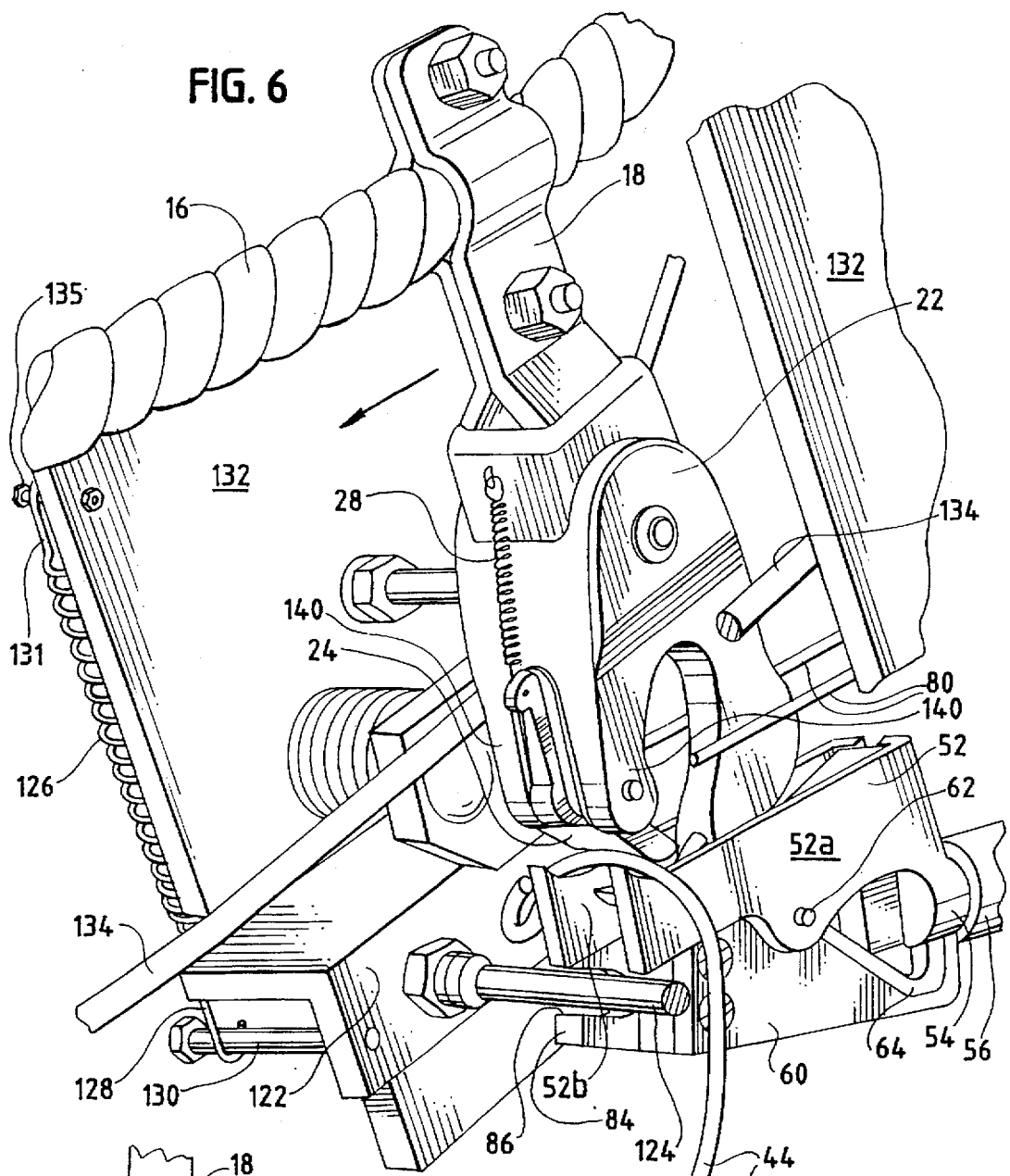
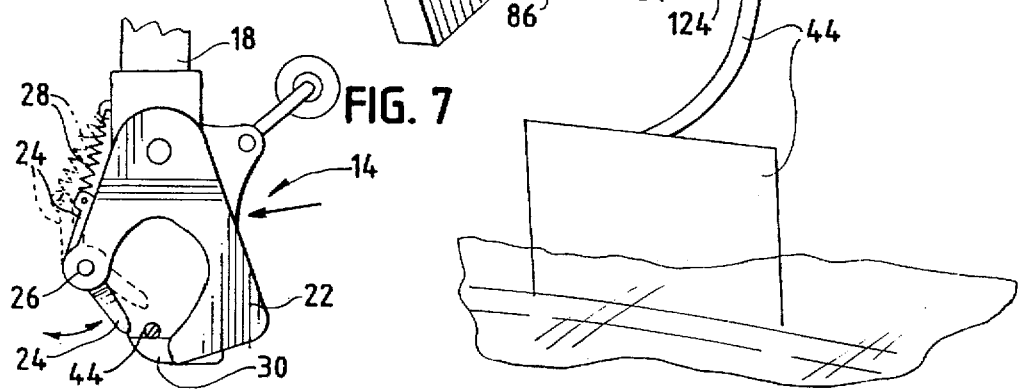

HANGER TRANSPORT SYSTEM

BACKGROUND OF THE INVENTION

The invention relates to a hanger transport system for transporting a plurality of hangers on which a plurality of garments may be hung and to a system for automatically feeding hangers into the hanger transport system.

Hanger transport systems may be used in connection with garment manufacturing and retailing operations in which garments are automatically conveyed to and from various locations. One hanger transport system that was used before the present invention by the assignee of the invention had a hook transport system with a plurality of hooks spaced at equal intervals along a hook conveyor in the form of a cable which carried the hooks along a conveyance direction. To pick up hangers having garments disposed thereon, the hooks passed by a hanger pickup station, at which point each incoming hook would pick up one of the hangers. A hanger supply member in the form of a downwardly sloped rod was associated with the hanger pickup station.

In the above system, hangers were manually transferred by an operator from the hanger supply member to the hanger pickup station. In particular, immediately after each incoming hook picked up a hanger from the hanger pickup station, the operator would manually move a hanger from the hanger supply member to the hanger pickup station, so that the next incoming hook would pick up that hanger. The manual transfer of hangers from the hanger supply member to the hanger pickup station is undesirable for various reasons, including the fact that the operator may not be able to transfer hangers fast enough to keep up with the rate of conveyance of the hooks by the hook transport system and since such manual transfer of hangers is tedious work.

SUMMARY OF THE INVENTION

The invention is directed to a transport system and method of transporting hangers on which garments may be hung and to a hanger feed system adapted to be coupled to such a transport system.

The hanger feed system may comprise a hanger supply member on which a plurality of hangers may be disposed and means for automatically feeding the hangers from the hanger supply member to a hanger pickup position at a rate substantially equal to the rate at which hooks are transported past the hanger feed system, the automatic feeding means being adapted to cause the hooks to periodically pick up the hangers.

The hanger feed system may be combined with a hook transport system having a hook conveyor and a plurality of hooks disposed along the hook conveyor. The hanger feed system may include a hanger feed apparatus adapted to periodically feed one of the hangers from the hanger supply member to the hanger pickup position, the hanger feed apparatus being adapted to cause a plurality of physical contacts to be made between the hook transport system and the hanger feed apparatus at a rate substantially equal to the rate at which hooks are conveyed by the hook transport system. Each of the physical contacts causes one of the hangers to be fed from the hanger supply member to the hanger pickup position, and the hooks of the hook transport system periodically pick up the hangers from the hanger pickup position.

The hanger feed apparatus may include a hanger holding member coupled to the hanger supply member, a feed member coupled to the hanger holding member, and an actuator mechanically coupled to the feed member and disposed to periodically make contact with the hooks. The actuator causes the feed member to transfer one of the hangers from the hanger supply member to the hanger pickup position on the hanger holding member when one of the hooks makes contact with the actuator. The actuator may include a contact member disposed to make physical contact with the hooks and a pivotable member coupled between the contact member and the feed member.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 1 is an illustration of a hanger transport system in accordance with the invention;

FIG. 2 is a side view of a portion of the hanger transport system with portions removed for clarity;

FIG. 3 is an elevational view of a portion of a hook shown engaged with a contact member of the hanger transport system with portions of the hook removed for clarity;

FIG. 4 is an illustration of the hanger transport system illustrating the engagement of a hook with the contact member;

FIG. 5 is a side view of a portion of the hanger transport system with portions removed for clarity;

FIG. 6 is a perspective view of a portion of the hanger transport system illustrating a hanger disposed at the hanger pickup position; and FIG. 7 is a side view of a hook of the hanger transport system.

DETAILED DESCRIPTION OF A PREFERRED EMBODIMENT

FIG. 1 illustrates a preferred embodiment of a hanger transport system 10 for use in picking up hangers on which garments are hung and transporting the hangers and garments in a conveyance direction in accordance with the invention. The hanger transport system 10 includes a hook transport system 12 for conveying a plurality of hooks 14 in a conveyance direction which, as indicated by the arrows, is generally right to left in FIG. 1. The hooks 14 are fixed to a hook conveyor, in the form of a cable 16, at equally spaced intervals along the cable 16 via a plurality of rigid mounting brackets 18, the top ends of which are disposed within a slot (not shown) formed in the underside of a stationary guide rail 20.

As shown in FIG. 7, each of the hooks 14 has a hook body 22 connected to one of the brackets 18, a hook closure member 24 disposed for pivoting movement at a pivot point 26, and a spring 28 for biasing the closure member 24 to a closed position in which, as shown in the solid lines in FIG. 7, the closure member 24 makes contact with a lip 30 of the hook body 22. As used herein, the term "hook" generally refers to any structure capable of picking up and carrying a hanger, and the particular structure of the hooks 14 described herein is not important to the invention.

As shown in FIG. 1, the hanger transport system 10 has a hanger supply member, in the form of a downwardly angled rod 40 and a tube 42. The rod 40 and tube 42 are adapted to support a plurality of hangers 44 on which hanging garments may be disposed. One end of the rod 40 is disposed within the tube 42, which is rigidly connected such as by welding, to a rigid support arm 46. The support arm 46 has a generally vertical portion 46a and a generally horizontal portion 46b rigidly connected thereto, the horizontal portion 46b being disposed directly beneath the rod 40 to provide support.

The system 10 includes a hanger feed apparatus 50 for automatically transferring hangers 44 from the hanger feed member 40, 42 to a hanger pickup position located on the feed apparatus 50. The hanger feed apparatus 50 includes a hanger holding member having a fixed head 52 connected to a cylindrical member 54 (shown in FIGS. 2 and 4) which is disposed within a cylindrical sleeve 56 and the tube 42 fixed to the rigid support arm 46. The head 52 has a pair of arms 52a, 52b (shown in FIG. 6) the ends of which curve upwardly to form a hanger pickup position indicated at 58 in FIG. 5. The upwardly curved ends of the arms 52a, 52b prevent the hangers 44 from falling off the end of the head 52.

The hanger feed apparatus 50 has a pivotable hanger feed member 60 pivotally connected to the fixed head 52 at a pivot point 62. The feed member 60 has a curved lifting arm 64 that is provided within a slot formed in the center of the cylindrical member 54. The feed member 60 is capable of pivoting between a first position in which the upper end of the lifting arm 64 lies lower than the upper surface of the cylindrical member 54, as shown in FIG. 2, and a second position in which the upper end of the lifting arm 64 is at least one-eighth of an inch above the upper surface of the fixed head 52 (see FIG. 5).

Referring to FIG. 2, the hanger feed apparatus 50 also includes a pivot member 70, connected to the rigid support arm 46, which is disposed for pivotal movement about a pivot point 72. The lower end of the pivot member 70 is spring-biased against the upper right-hand corner of the fixed head 52 by a spring 74 having one end which abuts against a post 76 connected to the support arm 46 and a second end which abuts against a post 78 fixed to the pivot member 70. A hanger stop 80 is connected to the pivot member 70 via a mounting bracket 82. The hanger stop 80 is generally U-shaped and has a pair of arms whose ends are disposed to the lower left as shown in FIG. 2 for the purpose of limiting the upward movement of the hanger 44 when lifted by the lifting arm 64. The hanger feed member 60 has a jaw member 84 with a slot 86 formed therein.

Referring to FIG. 1, the hanger feed system 10 has a mechanically driven actuator mechanism 90 with a contact member generally designated 92 and a rigid three-ended pivot member 94. The contact member 92, which is fixed to an upper end 96 of the pivot member 94, comprises a rigid L-shaped carrier 97 having a horizontal base portion 98 and a vertical portion 100. The base portion 98 supports a plastic U-shaped member 102 having a horizontal portion 104 and two sides 106 which extend vertically from the horizontal portion 104. A hook guide 110 is connected to the U-shaped member 102. The hook guide 110 has a pair of spaced-apart guide members, each of which has a metal guide rod 112 connected to one of the two sides 106 of the U-shaped member 102 via a bracket 114. The upper end 116 of each guide rod 112 flairs outwardly to ensure that the incoming hooks 14 pass through the two guide rods 112.

The pivot member 94 has a second end 120 pivotally connected to the rigid support arm 46 at a pivot point 121, and a third end 122 which is disposed adjacent the jaw member 84 of the hanger feed member 60. An actuator rod 124 fixed to the third end 122 of the pivot member 94 is journalled within the slot 86 formed in the jaw member 84 and controls the pivoting of the hanger feed member 60.

As shown in FIG. 6, the third end 122 of the pivot member 94 is biased upwardly by a spring 126 having a first end 128 disposed on a bolt 130 in the third end 122 of the pivot member 94 and a second end 131 connected to a bolt 135 in a support plate 132 fixed to the guide rail 20 (see FIG. 4). The support plate 132 has a hook guide, in the form of a pair of metal rods 134 disposed generally parallel to the conveyance direction of the hooks 14, which ensures that the hooks 14 are properly aligned to pass between the two arms 52a, 52b.

Referring to FIGS. 1 and 2, in operation, the hanger supply member 40, 42 is loaded (either manually or automatically) with a plurality of the hangers 44 on which hanging garments are disposed (a portion of a garment is shown disposed on the hanger 44 of FIG. 6). Upon being loaded, the hangers 44 will slide down the components 40, 42, 56 until the left-most hanger 44 abuts the right vertical face of the head 52, as shown in FIGS. 1 and 2.

During operation, the hooks 14 will be continuously conveyed by the cable 16 in the conveyance direction, generally from right to left as indicated by the arrows in FIG. 1. As each incoming hook 14 approaches the contact member 90, the outwardly extending portions 116 of the rods 112 will ensure that the incoming hook 14 will be aligned to pass between the rods 112.

As the incoming hook 14 passes between the rods 112, a pair of downwardly extending arms 140 of the hook body 22 between which the closure member 24 is disposed (see FIG. 6 and FIG. 3, in which the closure member 24 has been omitted for clarity) will make physical contact with the U-shaped member 102 at the points indicated at 136 in FIG. 3. As the hook 14 continues to pass through the guide rods 112, the arms 140 force the U-shaped member 102, and the carrier 97 to which it is connected, downwards. The downward movement of the carrier 97 causes the left end 122 of the pivot member 94 to pivot downwards. Consequently, the actuator rod 124 connected to the end 122 of the pivot member 94 is also forced downwards, which forces the jaw member 84 downwards, causing the hanger feed member 60 to pivot about the pivot point 62, forcing the curved lifting arm 64 upwards. The upper end of the lifting arm 64 lifts the hanger 44 adjacent the right vertical face of the head 52 upwards, as shown in FIGS. 4 and 5, until the hanger 44 is lifted to a height at least one-eighth of an inch higher than the upper surface of the right-hand portion of the head 52. At that point, the downwardly biased pivot member 70 forces the hanger 44 to the left, and the hanger 44 slides down the declined slope of the head 52 until it reaches the hanger pickup position 58, at which point further leftward movement of the hanger 44 is prevented by the upwardly curved ends of the arms 52a, 52b.

Referring to FIG. 6, with the hanger 44 disposed at the hanger pickup position 58, the bottom portion of the incoming hook 14 will pass through the two arms 52a, 52b of the head 52 so that the lower lip 30 of the hook 14 passes below the top curved portion of the hanger 44. When the bottom portion of the spring-biased closure member 24 of the incoming hook 14 makes contact with the hanger 44 at the hanger pickup position 58, that contact forces the bottom end of the closure member 24 to pivot inward, overcoming the force of the spring 28. As the hook 14 continues to move along the conveyance direction, the hanger 44 will become supported by the lower lip 30 of the hook 14, and the bottom portion of the spring-biased closure member 24 will pivot outward, due to the force of the spring 28, as shown in FIG. 7. The hanger 44 will thus be maintained on the hook 14 as it continues to be conveyed in the conveyance direction.

The physical contact of each incoming hook 14 with the contact member 90 causes a hanger 44 to be transferred to the hanger pickup position 58, and each such hook 14 subsequently picks up the hanger 44 from the pickup position 58 in the manner described above; consequently, the rate at which the are hooks 14 are conveyed is substantially equal to the rate at which the hangers 44 are transferred from the hanger supply member 40, 42 to the hanger pickup position 58, and thus the hangers 44 are automatically fed to the hanger pickup position 58 synchronously with the incoming hooks 14.

To prevent excessive wear due to the physical contact between the hooks 14 and the contact member 90, the body 22 of the hooks 14 and selected portions of the contact member 90 can be formed of wear-resistant materials, such as ultra-high molecular weight nylon.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A system for transporting a plurality of hangers on which a plurality of garments may be hung, said system comprising:
   a hook transport system having at least a hook conveyor and a plurality of hooks disposed along said hook conveyor, said hooks being moved by said hook conveyor along a conveyance direction at a first rate;
   a hanger supply member on which said plurality of hangers may be disposed; and
   a hanger feed apparatus adapted to periodically feed one of said hangers from said hanger supply member to a hanger pickup position, said hanger feed apparatus being adapted to cause a plurality of physical contacts to be made between said hook transport system and said hanger feed apparatus, said physical contacts occurring at a second rate substantially equal to said first rate, each of said physical contacts causing one of said hangers to be fed from said hanger supply member to said hanger pickup position, and being adapted to cause said hooks of said hook transport system to periodically pick up said hangers from said hanger pickup position, said hanger feed apparatus comprising:
      a hanger holding member coupled to said hanger supply member, said hanger pickup position being located on said hanger holding member;
      a feed member coupled to said hanger holding member; and
      an actuator mechanically coupled to said feed member and disposed to periodically make contact with said hooks, said actuator causing said feed member to transfer one of said hangers from said hanger supply member to said hanger pickup position on said hanger holding member when one of said hooks makes contact with said actuator, said actuator comprising:
         a contact member disposed to make physical contact with said hooks; and
         a rigid member coupled between said contact member and said feed member.

2. A system as defined in claim 1 wherein said hanger supply member comprises a non-horizontally disposed rod.

3. A system as defined in claim 1 wherein said hook conveyor comprises a cable and wherein said hooks are fixed to said cable at a plurality of equally spaced-apart points on said cable.

4. A system as defined in claim 1 wherein said hook conveyor comprises a cable and wherein said hook transport system additionally comprises:
   a plurality of brackets, each of said brackets connecting one of said hooks to said cable; and
   a guide rail for guiding said brackets along said conveyance direction.

5. A system for transporting a plurality of hangers on which a plurality of garments may be hung, said system comprising:
   a hook transport system having at least a hook conveyor and a plurality of hooks disposed along said hook conveyor, said hooks being moved by said hook conveyor along a conveyance direction at a first rate;
   a hanger supply member on which said plurality of hangers may be disposed; and
   a hanger feed apparatus adapted to periodically feed one of said hangers from said hanger supply member to a hanger pickup position, said hanger feed apparatus comprising means for causing one of said hangers to be fed from said hanger supply member to said hanger pickup position based exclusively on physical contact between said hook transport system and said hanger feed apparatus without the transmission of any electrical control signal between said hook transport system and said hanger feed apparatus, and being adapted to cause said hooks of said hook transport system to periodically pick up said hangers from said hanger pickup position.

6. A system as defined in claim 5 wherein said hanger supply member comprises a non-horizontally disposed rod.

7. A system for transporting a plurality of hangers on which a plurality of garments may be hung, said system comprising:
   a hook transport system having at least a hook conveyor and a plurality of hooks disposed along said hook conveyor, said hooks being moved by said hook conveyor long a conveyance direction at a first rate;
   a hanger supply member on which said plurality of hangers maybe disposed; and
   a hanger feed apparatus adapted to periodically feed one of said hangers from said hanger supply member to a hanger pickup position, said hanger feed apparatus being adapted to cause a plurality of physical contacts to be made between said hook transport system and said hanger feed apparatus, said physical contacts occurring at a second rate substantially equal to said first rate, each of said physical contacts causing one of said hangers to be fed from said hanger supply member to said hanger pickup position, and being adapted to cause said hooks of said hook transport system to periodically pick up said hangers from said hanger pickup position wherein said hanger feed apparatus comprises:
      a hanger holding member coupled to said hanger supply member, said hanger pickup position being located on said hanger holding member;
      a feed member coupled to said hanger holding member; and
      an actuator mechanically coupled to said feed member and disposed to periodically make contact with said hooks, said actuator causing said feed member to transfer one of said hangers from said hanger supply member to said hanger pickup position on said hanger holding member when one of said hooks makes contact with said actuator.

8. A system as defined in claim 7 wherein said feed member comprises a pivotable member connected to said hanger holding member at a pivot point.

9. A system as defined in claim 7 wherein said actuator comprises:

a contact member disposed to make physical contact with said hooks; and a pivotable member coupled between said contact member and said feed member.

10. A system as defined in claim 9 wherein said contact member comprises a U-shaped member.

11. A system as defined in claim 9 wherein said pivotable member is pivotable between a first position and a second position, additionally comprising means for biasing said pivotable member to said first position.

12. A system as defined in claim 5 additionally comprising a rigid support arm fixed to said hanger supply member.

13. A hanger feed system adapted to be coupled to a hook transport system in which a plurality of hooks are moved along a conveyance direction at a first rate, said hanger feed system comprising:

a hanger supply member on which said plurality of hangers may be disposed; and a hanger feed apparatus adapted to periodically feed one of said hangers from said hanger supply member to a hanger pickup position, said hanger feed apparatus comprising means for causing one of said hangers to be fed from said hanger supply member to said hanger pickup position based exclusively on physical contact between said hook transport system and said hanger feed apparatus without the transmission of any electrical control signal between said hook transport system and said hanger feed apparatus, and being adapted to cause said hooks of said hook transport system to periodically pick up said hangers from said hanger pickup position.

14. A hanger feed system adapted to be coupled to a hook transport system in which a plurality of hooks are moved along a conveyance direction at a first rate, said hanger feed system comprising:

a hanger supply member on which said plurality of hangers may be disposed; and a hanger feed apparatus adapted to periodically feed one of said hangers from said hanger supply member to a hanger pickup position, said hanger feed apparatus being adapted to cause a plurality of physical contacts to be made between said hook transport system and said hanger feed apparatus, said physical contacts occurring at a second rate substantially equal to said first rate, each of said physical contacts causing one of said hangers to be fed from said hanger supply member to said hanger pickup position, and being adapted to cause said hooks of said hook transport system to periodically pick up said hangers from said hanger pickup position wherein said hanger feed apparatus comprises:

a hanger holding member coupled to said hanger supply member, said hanger pickup position being located on said hanger holding member;

a feed member coupled to said hanger holding member; and an actuator mechanically coupled to said feed member and disposed to periodically make contact with said hooks, said actuator causing said feed member to transfer one of said hangers from said hanger supply member to said hanger pickup position on said hanger holding member when one of said hooks makes contact with said actuator.

15. A system as defined in claim 14 wherein said actuator comprises:

a contact member disposed to make physical contact with said hooks; and a pivotable member coupled between said contact member and said feed member.

16. A system as defined in claim 14 wherein said feed member comprises a pivotable member connected to said hanger holding member at a pivot point.

17. A system as defined in claim 16 wherein said pivotable member is pivotable between a first position and a second position, additionally comprising means for biasing said pivotable member to said first position.

18. A system for transporting a plurality of hangers on which a plurality of garments may be hung, said system comprising:

a hook transport system having at least a hook conveyor and a plurality of hooks disposed along said hook conveyor, said hooks being moved by said hook conveyor along a conveyance direction at a first rate;

a hanger supply member on which said plurality of hangers may be disposed; and means for automatically feeding said hangers from said hanger supply member to said hanger pickup position at a second rate based exclusively on physical contact with said hook transport system and without the transmission of any electrical control signal from said hook transport system, said second rate being substantially equal to said first rate, said feeding means being adapted to cause said hooks of said hook transport system to periodically pick up said hangers from said hanger pickup position.

19. A method comprising the steps of:

(a) providing a plurality of hangers to a hanger supply member;

(b) providing a hook transport system in which a plurality of hooks are conveyed in a conveyance direction at a first rate;

(c) automatically causing said hangers to be transferred from said hanger supply member to a hanger pickup position at a second rate based exclusively on physical contact with said hook transport system and without the transmission of any electrical control signal from said hook transport system, said second rate being substantially equal to said first rate; and (d) causing said hooks of said transport system to periodically pickup said hangers from said hanger pickup position.

\* \* \* \* \*